United States Patent
Zhao et al.

(10) Patent No.: US 10,922,804 B2
(45) Date of Patent: Feb. 16, 2021

(54) METHOD AND APPARATUS FOR EVALUATING IMAGE DEFINITION, COMPUTER DEVICE AND STORAGE MEDIUM

(71) Applicant: BAIDU ONLINE NETWORK TECHNOLOGY (BEIJING) CO., LTD., Beijing (CN)

(72) Inventors: Xiang Zhao, Beijing (CN); Xin Li, Beijing (CN); Xiao Liu, Beijing (CN); Xubin Li, Beijing (CN); Hao Sun, Beijing (CN); Shilei Wen, Beijing (CN); Errui Ding, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 106 days.

(21) Appl. No.: 16/211,052

(22) Filed: Dec. 5, 2018

(65) Prior Publication Data
US 2019/0172193 A1 Jun. 6, 2019

(30) Foreign Application Priority Data
Dec. 6, 2017 (CN) .......................... 2017 1 1278216

(51) Int. Cl.
*G06T 7/00* (2017.01)
*G06N 20/00* (2019.01)
(Continued)

(52) U.S. Cl.
CPC .............. *G06T 7/0002* (2013.01); *G06N 3/08* (2013.01); *G06N 20/00* (2019.01); *G06T 3/40* (2013.01);
(Continued)

(58) Field of Classification Search
CPC ..................... G06T 7/0002; G06T 3/40; G06T 2207/20016; G06T 2207/20081;
(Continued)

(56) References Cited

U.S. PATENT DOCUMENTS

| 2013/0108152 A1* | 5/2013 | Deng ................... G06F 16/5854 382/159 |
| 2018/0032846 A1* | 2/2018 | Yang ...................... G06K 9/4604 |
| 2019/0197364 A1* | 6/2019 | Cheng .................... G06F 16/113 |

FOREIGN PATENT DOCUMENTS

| CN | 103155533 A | 6/2013 |
| CN | 106548468 A | 3/2017 |
| WO | 2011058621 A1 | 5/2011 |

OTHER PUBLICATIONS

Squeeze-and-Excitation Networks, Jie Hu, Li Shen, Gang Sun ILSVRC 2017 image classification winner Tue, Sep. 5, 2017 Computer Vision and Pattern Recognition (cs.CV).*
(Continued)

Primary Examiner — Marcos L Torres
(74) Attorney, Agent, or Firm — Ladas & Parry, LLP

(57) ABSTRACT

The present disclosure provides a method and apparatus for evaluating image definition, a computer device and a storage medium, wherein the method comprises: obtaining an image to be processed; inputting the image to be processed to a pre-trained evaluation model; obtaining an comprehensive image definition score outputted by the evaluation model, the comprehensive image definition score being obtained by the evaluation model by obtaining N image definition scores based on N different scales respectively, and then integrating the N image definition scores, N being a positive integer greater than one. The solution of the present invention can be applied to improve the accuracy of the evaluation result.

14 Claims, 3 Drawing Sheets

(51) Int. Cl.
*G06N 3/08* (2006.01)
*G06T 3/40* (2006.01)

(52) U.S. Cl.
CPC .............. *G06T 2207/20016* (2013.01); *G06T 2207/20081* (2013.01); *G06T 2207/20084* (2013.01); *G06T 2207/30168* (2013.01)

(58) Field of Classification Search
CPC ........... G06T 2207/30168; G06T 2207/20084; G06N 20/00; G06N 3/40; G06N 3/08
See application file for complete search history.

(56) References Cited

OTHER PUBLICATIONS

First Office Action and Search Report from CN app. No. 201711278216.4, dated Feb. 28, 2019, with English translation from Google Translate.
Second Office Action from CN app. No. 201711278216.4, dated Apr. 28, 2019, with English translation from Google Translate.

\* cited by examiner

METHOD AND APPARATUS FOR EVALUATING IMAGE DEFINITION, COMPUTER DEVICE AND STORAGE MEDIUM

The present application claims the priority of Chinese Patent Application No. 201711278216.4, filed on Dec. 6, 2017, with the title of "Method and apparatus for evaluating image definition, computer device and storage medium". The disclosure of the above applications is incorporated herein by reference in its entirety.

FIELD OF THE DISCLOSURE

The present disclosure relates to computer application technologies, and particularly to a method and apparatus for evaluating image definition, a computer device and a storage medium.

BACKGROUND OF THE DISCLOSURE

With the rapid development of the Internet content ecology, more and more kinds of information arise with images and videos as carriers. The definition of images and videos has a great influence on the user experience. For this reason, the image definition needs to be evaluated to filter out blurred images, and the definition of the video can be determined by combining the sharpness of the multi-frame images.

In the prior art, an image classifier is generally used to divide the image into two categories: clear and fuzzy. The image classifier can be a neural network model, the input of the model is an image, the output is scores of the fuzzy class and the clear class, and the class with a higher score is taken as the class of the image.

Image definition is much related to an image size. For example, an image of 800*800 is not clear, but it may become clearer after being compressed to the size required by the neural network model, for example 224*224. In the prior art, the resolution of the image is evaluated from a uniform scale, and the evaluation result may be inaccurate for larger or smaller images.

SUMMARY OF THE DISCLOSURE

In view of the above, the present disclosure provides a method and apparatus for evaluating image definition, a computer device and a storage medium, which can improve the accuracy of the evaluation result.

Specific technical solutions are as follows:

A method for evaluating image definition, comprising:
obtaining an image to be processed;
inputting the image to be processed to a pre-trained evaluation model;
obtaining an comprehensive image definition score outputted by the evaluation model, the comprehensive image definition score being obtained by the evaluation model by obtaining N image definition scores based on N different scales respectively, and then integrating the N image definition scores, N being a positive integer greater than one.

According to a preferred embodiment of the present disclosure, before obtaining the image to be processed, the method further comprises:
obtaining images of different definitions respectively, and obtaining a comprehensive image definition score of each image;

training according to the obtained images and the corresponding comprehensive image definition scores to obtain the evaluation model.

According to a preferred embodiment of the present disclosure, the obtaining the comprehensive image definition score of each image comprises:
for each image, respectively obtaining a manually annotated definition class to which the image belongs, the number of definition classes being greater than one, and taking a preset score corresponding to the definition class to which the image belongs as the comprehensive image definition score of the image.

According to a preferred embodiment of the present disclosure, the evaluation model comprises: a Se-ResNeXt50 model.

According to a preferred embodiment of the present disclosure, each image definition score corresponds to one block in the Se-ResNeXt50 model, and N image definition scores correspond to last N blocks in the Se-ResNeXt50 model;
N branches are extracted from the N blocks, and each branch respectively combines with image size information to obtain the image definition score.

According to a preferred embodiment of the present disclosure, the comprehensive image definition score is a mean value of the N image definition scores.

According to a preferred embodiment of the present disclosure,
before training to obtain the evaluation model, the method further comprises:
performing pre-processing for the obtained image to adjust the obtained image to a size required by the evaluation model;
before inputting the image to be processed into the pre-trained evaluation model, the method further comprises:
performing pre-processing for the image to be processed to adjust the image to be processed to a size required by the evaluation model.

According to a preferred embodiment of the present disclosure, the adjusting the image to a size required by the evaluation model comprises:
if a long side of the image is smaller than a length required by the evaluation model, and a short side of the image is smaller than the length required by the evaluation model, the long side and the short side of the image are respectively adjusted to the length required by the evaluation model by adding a gray margin;
if the long side of the image is larger than the length required by the evaluation model, the long side of the image is compressed to the length required by the evaluation model, and the short side of the image is compressed according to the same compression ratio; if the short side after the compression is smaller than the length required by the evaluation model, the short side of the image is adjusted to the length required by the evaluation model by adding a gray margin.

An apparatus for evaluating image definition, comprising: an obtaining unit and an evaluating unit;
the obtaining unit is configured to obtain an image to be processed;
the evaluating unit is configured to input the image to be processed to a pre-trained evaluation model, obtain an comprehensive image definition score outputted by the evaluation model, the comprehensive image definition score being obtained by the evaluation model by obtaining N image definition scores based on N different scales respectively, and then integrating the N image definition scores, N being a positive integer greater than one.

According to a preferred embodiment of the present disclosure, the apparatus further comprises: a pre-processing unit;

the pre-processing unit is configured to, before the obtaining unit obtains the image to be processed, obtain images of different definitions respectively, and obtain the comprehensive image definition score of each image, and then train according to the obtained images and the corresponding comprehensive image definition scores to obtain the evaluation model.

According to a preferred embodiment of the present disclosure, the pre-processing unit, for each image, respectively obtain a manually annotated definition class to which the image belongs, the number of definition classes being greater than one, and take a preset score corresponding to the definition class to which the image belongs as the comprehensive image definition score of the image.

According to a preferred embodiment of the present disclosure, the evaluation model comprises: a Se-Res-NeXt50 model.

According to a preferred embodiment of the present disclosure, each image definition score corresponds to one block in the Se-ResNeXt50 model, and N image definition scores correspond to last N blocks in the Se-ResNeXt50 model;

N branches are extracted from the N blocks, and each branch respectively combines with image size information to obtain the image definition score.

According to a preferred embodiment of the present disclosure, the comprehensive image definition score is a mean value of the N image definition scores.

According to a preferred embodiment of the present disclosure, the pre-processing unit is further configured to, before training to obtain the evaluation model, perform pre-processing for the obtained image to adjust the obtained image to a size required by the evaluation model;

the pre-processing unit is further configured to, before inputting the image to be processed into the pre-trained evaluation model, perform pre-processing for the image to be processed to adjust the image to be processed to a size required by the evaluation model.

According to a preferred embodiment of the present disclosure, the pre-processing unit and the valuation unit adjust the image to the size required by the evaluation model in the following manner:

if a long side of the image is smaller than a length required by the evaluation model, and a short side of the image is smaller than the length required by the evaluation model, the long side and the short side of the image are respectively adjusted to the length required by the evaluation model by adding a gray margin;

if the long side of the image is larger than the length required by the evaluation model, the long side of the image is compressed to the length required by the evaluation model, and the short side of the image is compressed according to the same compression ratio; if the short side after the compression is smaller than the length required by the evaluation model, the short side of the image is adjusted to the length required by the evaluation model by adding a gray margin.

A computer device, comprising a memory, a processor and a computer program which is stored on the memory and runs on the processor, the processor, upon executing the program, implementing the above-mentioned method.

A computer-readable storage medium on which a computer program is stored, the program, when executed by the processor, implementing the aforesaid method.

As can be seen from the above introduction, according to solutions of the present disclosure, after the image to be processed is obtained, the image to be processed may be input to the pre-trained evaluation model, thereby obtaining the comprehensive image definition score output by the evaluation model; the comprehensive image definition score is obtained by the evaluation model by obtaining N image definition scores based on N different scales respectively, and then integrating the N image definition scores, N being a positive integer greater than one. That is to say, multi-scale information can be combined in the solution of the above method embodiment to evaluate the image definition, thereby improving the accuracy of the evaluation results.

DETAILED DESCRIPTION OF PREFERRED EMBODIMENTS

Technical solutions of the present disclosure will be described in more detail in conjunction with figures and embodiments to make technical solutions of the present disclosure clear and more apparent.

Obviously, the described embodiments are partial embodiments of the present disclosure, not all embodiments. Based on embodiments in the present disclosure, all other embodiments obtained by those having ordinary skill in the art without making inventive efforts all fall within the protection scope of the present disclosure.

Figure 1:
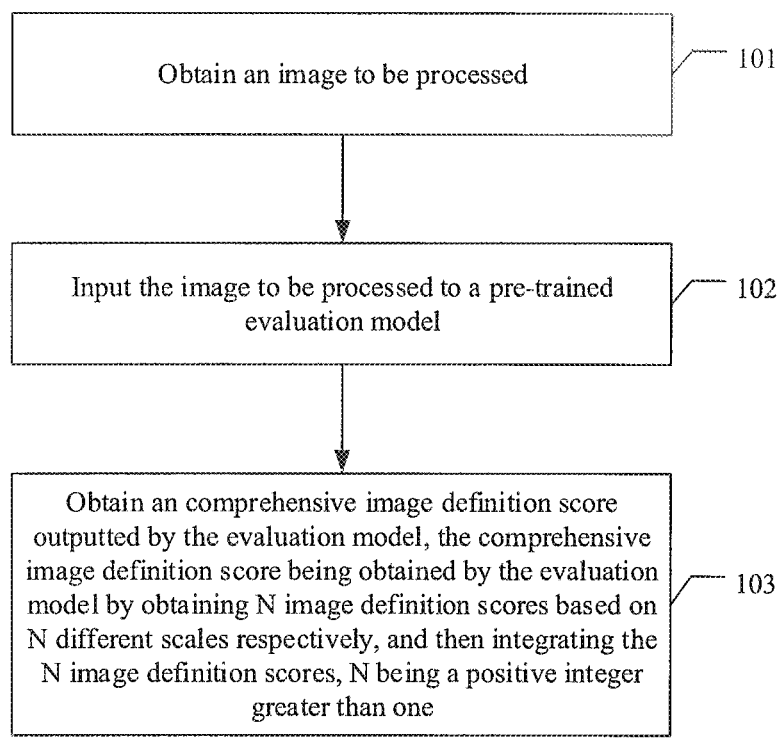
FIG. 1 is a flow chart of an embodiment of a method for evaluating image definition according to the present disclosure.

FIG. 1 is a flow chart of an embodiment of a method for evaluating image definition according to the present disclosure. As shown in FIG. 1, the embodiment comprises the following specific implementation mode.

In 101, an image to be processed is obtained.

In 102, the image to be processed is input to a pre-trained evaluation model.

In 103, an comprehensive image definition score outputted by the evaluation model is obtained, and the comprehensive image definition score is obtained by the evaluation model by obtaining N image definition scores based on N different scales respectively, and then integrating the N image definition scores, N being a positive integer greater than one.

It can be seen that in the present embodiment, the image definition is evaluated based on the evaluation model, and the evaluation model is pre-trained.

To this end, it is necessary to obtain images of different definitions respectively, and obtain the comprehensive image definition score of each image, and then train according to the obtained images and the corresponding comprehensive image definition scores to obtain the evaluation model.

Specifically, for each image, a manually annotated definition class to which the image belongs may be obtained respectively, and the number of definition classes is greater than one, and the specific number may be determined according to actual needs. Further, it is possible to take a preset score corresponding to the definition class to which the image belongs as the comprehensive image definition score of the image.

For example, it is possible to collect images of various sizes and various definitions from the Internet and manually annotate them as fuzzy, general or clear. For an image annotated as fuzzy, the comprehensive image definition score may be 0; For an image annotated as general, the comprehensive image definition score may be 0.5; for an image annotated as clear, the comprehensive image definition score may be 1.

In addition, the obtained image may be pre-processed to adjust the obtained image to the size required by the evaluation model.

Wherein, if a long side of the image is smaller than the length required by the evaluation model, and a short side of the image is smaller than the length required by the evaluation model, the long side and the short side of the image may be respectively adjusted to the length required by the evaluation model by adding a gray margin.

If the long side of the image is larger than the length required by the evaluation model, the long side of the image is compressed to the length required by the evaluation model, and the short side of the image is compressed according to the same compression ratio. If the short side after the compression is smaller than the length required by the evaluation model, the short side of the image is adjusted to the length required by the evaluation model by adding a gray margin.

For example, if the image size required by the evaluation model is 224*224 and image a is sized as 180*150, then the long side and the short side of the image a can be respectively adjusted to 224 by adding a gray margin, that is, the image a is adjusted to 224*224 size.

For another example, if the image size required by the evaluation model is 224*224 and image b is size as 600*400, then the long side of the image b can be first compressed to 224 size, and then the short side of the image b is compressed according to the compression ratio of the long side, and the compressed short side is adjusted to 224 by adding the gray margin.

When the gray margin-adding operation is performed, a value of the added pixel point may be a mean value of pixel points in the image. How to perform the gray margin-adding operation and how to perform image compression is of a prior art.

After the pre-processing is completed, the evaluation model can be obtained by training according to the pre-processed image and the corresponding comprehensive image definition score.

The evaluation model in the present embodiment may be a Se-ResNeXt50 model, that is, using Se-ResNeXt50 as a basic network structure. The network is composed of a plurality of blocks. When a block is passed each time, width and height of a feature map become ½ of a preceding block. As such, if output of the last block is employed to pass through a fully-connected layer to obtain a final image definition evaluation result, this is equivalent to selecting only one scale information.

In this embodiment, N branches can be extracted from the last N blocks, and each branch respectively combines with image size information to obtain an image definition score (0, 0.5, 1).

N is a positive integer greater than one. The specific value may be determined according to actual needs. For example, the value may be 3, that is, three branches are extracted from the last three blocks.

Upon the model training, for the input image and the corresponding comprehensive image definition score, it is possible to calculate gradients for parameters of N branches of neural networks, and perform parameter updating by using a gradient descent method commonly used in the neural network training until the N branches of networks all converge.

It is possible to average the image definition scores of the N branches to obtain a final score. In this way, the image definition evaluation is performed in conjunction with information of N scales, and a good evaluation effect is achieved for larger or smaller images.

Based on the above introduction, how to train the Se-ResNeXt50 model is prior art.

After the training of the Se-ResNeXt50 model is completed, it is possible to perform actual image definition evaluation, i.e., first obtain a image to be processed, then perform pre-processing for the image to be processed, and thereby adjust the image to be processed to a size required by the Se-ResNeXt500 model.

For example, if the long side of the image to be processed is smaller than the length required by the Se-ResNeXt50 model, and the short side of the image to be processed is smaller than the length required by the Se-ResNeXt50 model, the long side and the short side of the image to be processed may be adjusted respectively to the length required by the Se-ResNeXt50 model by adding a gray margin.

If the long side of the image to be processed is larger than the length required by the Se-ResNeXt50 model, the long side of the image to be processed is compressed to the length required by the Se-ResNeXt50 model, and then the short side of the image to be processed is compressed according to the compression ratio. If the short side after compression is smaller than the length required by the Se-ResNeXt50 model, the short side of the image to be processed is adjusted to the length required by the Se-ResNeXt50 model by adding a gray margin.

Then, the image to be processed may be input to the Se-ResNeXt50 model to obtain an comprehensive image definition score output by the Se-ResNeXt50 model.

The Se-ResNeXt50 model will obtain N image definition scores based on N different scales, that is, each image definition score corresponds to one block in the Se-ResNeXt50 model, and N image definition scores correspond to last N blocks in the Se-ResNeXt50 model. Then, it is possible to calculate a mean value of the N image definition scores, and take the obtained mean value as a final result, namely, the comprehensive image definition score output.

Figure 2:
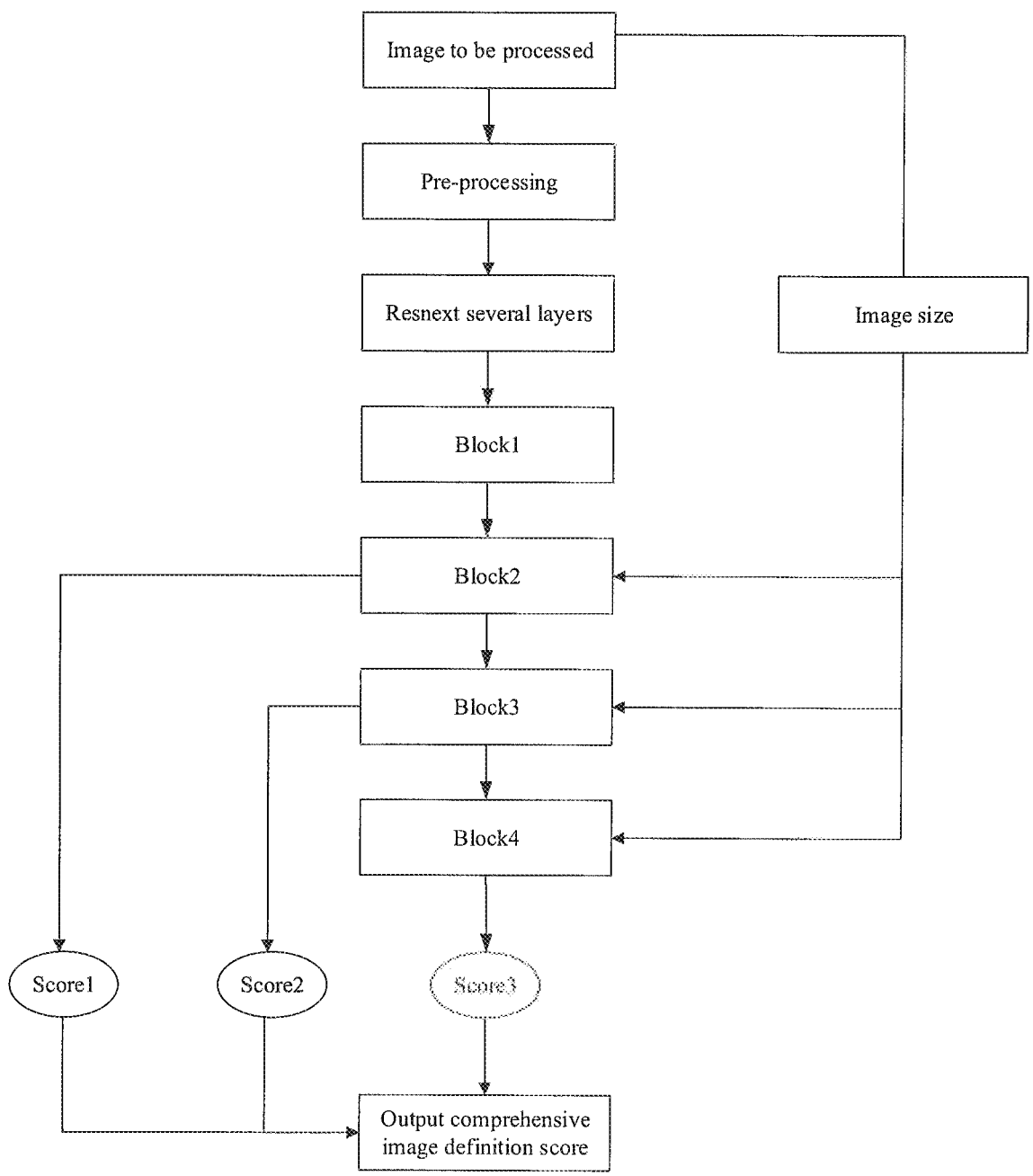
FIG. 2 is a schematic diagram of an implementation process of a method for evaluating image definition according to the present disclosure.

Based on the above introduction, FIG. 2 is a schematic diagram of an implementation process of a method for evaluating image definition according to the present disclosure.

As shown in FIG. 2, it is possible to first perform pre-processing for the image to be processed, and thereby adjust the image to be processed to the size required by the Se-ResNeXt50 model.

Then, it is possible to input the pre-processed image to the Se-ResNeXt50 model, and extract three branches from the last three blocks of the Se-ResNeXt50 model, each branch being combined with the image size information to obtain image definition scores: Score1, Score2 and Score3 respectively, solve a mean value from Score1, Score2 and Score3 to get a finally-desired comprehensive image definition score output.

Subsequently, it is possible to perform further processing according to the obtained comprehensive image definition score. For example, it is possible to compare the comprehensive image definition score with a preset threshold. If the comprehensive image definition score is greater than the threshold, the image to be processed may be determined as a clear image, otherwise, the image to be processed may be determined as a blurred image.

In summary, using the solution described in the foregoing method embodiment, after the image to be processed is obtained, the image to be processed may be input to the Se-ResNeXt50 model, thereby obtaining the comprehensive image definition score output by the Se-ResNeXt50 model. The comprehensive image definition score is obtained by the Se-ResNeXt50 model by obtaining N image definition scores based on N different scales respectively, and then integrating the N image definition scores, N being a positive integer greater than one. That is to say, multi-scale information can be combined in the solution of the above method embodiment to evaluate the image definition, thereby improving the accuracy of the evaluation results.

In addition, it is possible to evaluate the definition of a video in conjunction with the definition of the multi-frame image.

The above introduces the method embodiments. The solution of the present disclosure will be further described through an apparatus embodiment.

Figure 3:
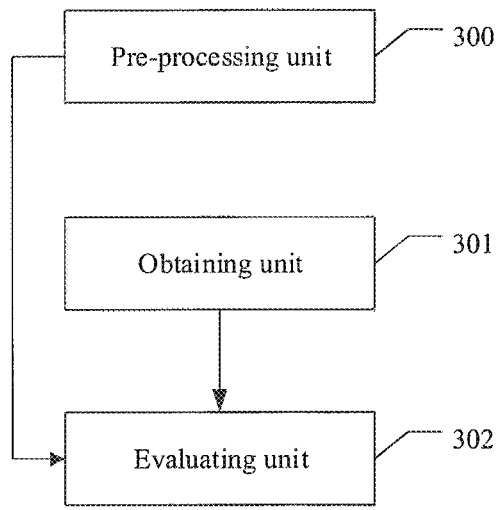
FIG. 3 is a block diagram of an apparatus for evaluating image definition according to the present disclosure.

FIG. 3 is a block diagram of an apparatus for evaluating image definition according to the present disclosure. As shown in FIG. 3, the apparatus comprises: an obtaining unit 301 and an evaluating unit 302.

The obtaining unit 301 is configured to obtain an image to be processed.

The evaluating unit 302 is configured to input the image to be processed to a pre-trained evaluation model, obtain an comprehensive image definition score outputted by the evaluation model, the comprehensive image definition score being obtained by the evaluation model by obtaining N image definition scores based on N different scales respectively, and then integrating the N image definition scores, N being a positive integer greater than one.

It can be seen that in the present embodiment, the image definition is evaluated based on the evaluation model, and the evaluation model is pre-trained.

To this end, as shown in FIG. 3, the apparatus of the present embodiment may further comprise: a pre-processing unit 300.

The pre-processing unit 300 is configured to, before the obtaining unit 301 obtains the image to be processed, obtain images of different definitions respectively, and obtain the comprehensive image definition score of each image, and then train according to the obtained images and the corresponding comprehensive image definition scores to obtain the evaluation model, and thereby send the evaluation module to the evaluating unit 302.

Specifically, the pre-processing unit 300 may, for each image, respectively obtain a manually annotated definition class to which the image belongs, the number of definition classes being greater than one, and take a preset score corresponding to the definition class to which the image belongs as the comprehensive image definition score of the image.

For example, it is possible to collect images of various sizes and various definitions from the Internet and manually annotate them as fuzzy, general or clear. For an image annotated as fuzzy, the comprehensive image definition score may be 0; for an image annotated as general, the comprehensive image definition score may be 0.5; for an image annotated as clear, the comprehensive image definition score may be 1.

In addition, the pre-processing unit 300 may perform pre-processing for the obtained image to adjust the obtained image to the size required by the evaluation model.

For example, if a long side of the image is smaller than the length required by the evaluation model, and a short side of the image is smaller than the length required by the evaluation model, the long side and the short side of the image may be respectively adjusted to the length required by the evaluation model by adding a gray margin.

If the long side of the image is larger than the length required by the evaluation model, the long side of the image is compressed to the length required by the evaluation model, and the short side of the image is compressed according to the same compression ratio. If the short side after the compression is smaller than the length required by the evaluation model, the short side of the image is adjusted to the length required by the evaluation model by adding a gray margin.

After the pre-processing is completed, the pre-processing unit 300 may train according to the pre-processed image and the corresponding comprehensive image definition score to obtain the evaluation model.

The evaluation model in the present embodiment may be a Se-ResNeXt50 model, that is, using Se-ResNeXt50 as a basic network structure. The network is composed of a plurality of blocks. When a block is passed each time, width and height of a feature map become ½ of a preceding block. As such, if output of the last block is employed to pass through a fully-connected layer to obtain a final image definition evaluation result, this is equivalent to selecting only one scale information.

In this embodiment, N branches can be extracted from the last N blocks, and each branch respectively combines with image size information to obtain an image definition score (0, 0.5, 1).

N is a positive integer greater than one. The specific value may be determined according to actual needs. For example, the value may be 3, that is, three branches are extracted from the last three blocks.

It is possible to average the image definition scores of the N branches to obtain a final score. In this way, the image definition evaluation is performed in conjunction with information of N scales, and a good evaluation effect is achieved for larger or smaller images.

After the training of the Se-ResNeXt50 model is completed, it is possible to perform actual image definition evaluation, i.e., the obtaining unit 301 first obtains a image to be processed, and sends it to the evaluating unit 302, the evaluating unit 302 performs pre-processing for the image to be processed, and thereby adjusts the image to be processed to a size required by the Se-ResNeXt50 model.

Then, the evaluating unit 302 may input the image to be processed to the Se-ResNeXt50 model to thereby obtain an comprehensive image definition score output by the Se-ResNeXt50 model.

The Se-ResNeXt50 model will obtain N image definition scores based on N different scales, that is, each image definition score corresponds to one block in the Se-ResNeXt50 model, and N image definition scores correspond to last N blocks in the Se-ResNeXt50 model. Then, it is possible to calculate a mean value of the N image definition scores, and take the obtained mean value as a final result, namely, the comprehensive image definition score output.

Reference may be made to corresponding depictions in the aforesaid method embodiments for a specific workflow of the apparatus embodiments shown in FIG. 3. The workflow is not detailed any more.

Figure 4:
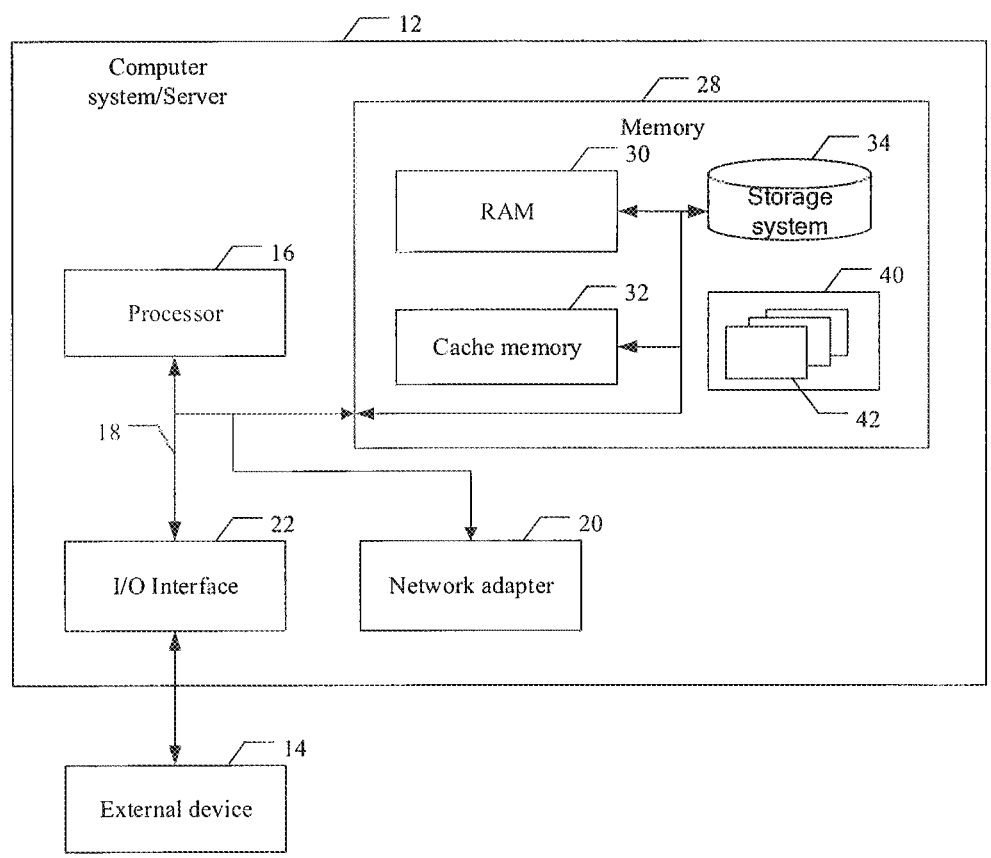
FIG. 4 illustrates a block diagram of an example computer system/server 12 adapted to implement an implementation mode of the present disclosure.

FIG. 4 illustrates a block diagram of an example computer system/server 12 adapted to implement an implementation mode of the present disclosure. The computer system/server 12 shown in FIG. 4 is only an example and should not bring about any limitation to the function and scope of use of the embodiments of the present disclosure.

As shown in FIG. 4, the computer system/server 12 is shown in the form of a general-purpose computing device. The components of computer system/server 12 may include, but are not limited to, one or more processors (processing units) 16, a memory 28, and a bus 18 that couples various system components including system memory 28 and the processor 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

Memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 4 and typically called a "hard drive"). Although not shown in FIG. 4, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. The memory 28 may include at least one program product having a set (e.g., at least one) of program modules that are configured to carry out the functions of embodiments of the present disclosure.

Program/utility 40, having a set (at least one) of program modules 42, may be stored in the system memory 28 by way of example, and not limitation, as well as an operating system, one or more disclosure programs, other program modules, and program data. Each of these examples or a certain combination thereof might include an implementation of a networking environment. Program modules 42 generally carry out the functions and/or methodologies of embodiments of the present disclosure.

Computer system/server 12 may also communicate with one or more external devices 14 such as a keyboard, a pointing device, a display 24, etc.; with one or more devices that enable a user to interact with computer system/server 12; and/or with any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted in FIG. 4, network adapter 20 communicates with the other communication modules of computer system/server 12 via bus 18. It should be understood that although not shown, other hardware and/or software modules could be used in conjunction with computer system/server 12. Examples, include, but are not limited to: microcode, device drivers, redundant processing units, external disk drive arrays, RAID systems, tape drives, and data archival storage systems, etc.

The processor 16 executes various function applications and data processing by running programs stored in the memory 28, for example, implement the method in the embodiment shown in FIG. 1.

The present disclosure meanwhile provides a computer-readable storage medium on which a computer program is stored, the program, when executed by the processor, implementing the method stated in the embodiment shown in FIG. 1.

The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the embodiments provided by the present disclosure, it should be understood that the revealed apparatus and method can be implemented in other ways. For example, the above-described embodiments for the apparatus are only exemplary, e.g., the division of the units is merely logical one, and, in reality, they can be divided in other ways upon implementation.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be implemented in the form of hardware, or they can be implemented with hardware plus software functional units.

The aforementioned integrated unit in the form of software function units may be stored in a computer readable storage medium. The aforementioned software function units are stored in a storage medium, including several instructions to instruct a computer device (a personal computer, server, or network equipment, etc.) or processor to perform some steps of the method described in the various embodiments of the present disclosure. The aforementioned storage medium includes various media that may store program codes, such as U disk, removable hard disk, Read-Only Memory (ROM), a Random Access Memory (RAM), magnetic disk, or an optical disk.

What are stated above are only preferred embodiments of the present disclosure and not intended to limit the present disclosure. Any modifications, equivalent substitutions and improvements made within the spirit and principle of the present disclosure all should be included in the extent of protection of the present disclosure.

What is claimed is:

1. A method for evaluating image definition, characterized in that the method comprises:
    obtaining images of different definitions respectively, and obtaining a comprehensive image definition score of each image;
    training according to the obtained images and the corresponding comprehensive image definition scores to obtain an evaluation model;
    obtaining an image to be processed;
    inputting the image to be processed to the pre-trained evaluation model;
    obtaining a comprehensive image definition score outputted by the evaluation model, the comprehensive image definition score being obtained by the evaluation model by obtaining N image definition scores based on N different scales respectively, and then integrating the N image definition scores, N being a positive integer greater than one,
    wherein the obtaining of the comprehensive image definition score of each image comprises:
    for each image, respectively obtaining a manually annotated definition class to which the image belongs, the number of definition classes being greater than one, and taking a preset score corresponding to the definition class to which the image belongs as the comprehensive image definition score of the image.

2. The method according to claim 1, wherein the evaluation model comprises: a Se-ResNeXt50 model.

3. The method according to claim 2, wherein
    each image definition score corresponds to one block in the Se-ResNeXt50 model, and N image definition scores correspond to last N blocks in the Se-ResNeXt50 model;
    N branches are extracted from the N blocks, and each branch respectively combines with image size information to obtain the image definition score.

4. The method according to claim 1, wherein
    the comprehensive image definition score is a mean value of the N image definition scores.

5. The method according to claim 1, wherein before training to obtain the evaluation model, the method further comprises: performing pre-processing for the obtained image to adjust the obtained image to a size required by the evaluation model; before inputting the image to be processed into the pre-trained evaluation model, the method further comprises: performing pre-processing for the image to be processed to adjust the image to be processed to a size required by the evaluation model.

6. The method according to claim 5, wherein
    the adjusting the image to a size required by the evaluation model comprises:
    if a long side of the image is smaller than a length required by the evaluation model, and a short side of the image is smaller than the length required by the evaluation model, the long side and the short side of the image are respectively adjusted to the length required by the evaluation model by adding a gray margin;
    if the long side of the image is larger than the length required by the evaluation model, the long side of the image is compressed to the length required by the evaluation model, and the short side of the image is compressed according to the same compression ratio; if the short side after the compression is smaller than the length required by the evaluation model, the short side of the image is adjusted to the length required by the evaluation model by adding a gray margin.

7. A computer device, comprising a memory, a processor and a computer program which is stored on the memory and runs on the processor, wherein the processor, upon executing the program, implements a method for evaluating image definition, characterized in that the method comprises:
    obtaining images of different definitions respectively, and obtaining a comprehensive image definition score of each image;
    training according to the obtained images and the corresponding comprehensive image definition scores to obtain an evaluation model;
    obtaining an image to be processed;
    inputting the image to be processed to the pre-trained evaluation model;

obtaining a comprehensive image definition score outputted by the evaluation model, the comprehensive image definition score being obtained by the evaluation model by obtaining N image definition scores based on N different scales respectively, and then integrating the N image definition scores, N being a positive integer greater than one, wherein the obtaining of the comprehensive image definition score of each image comprises:

for each image, respectively obtaining a manually annotated definition class to which the image belongs, the number of definition classes being greater than one, and taking a preset score corresponding to the definition class to which the image belongs as the comprehensive image definition score of the image.

8. The computer device according to claim 7, wherein the evaluation model comprises: a Se-ResNeXt50 model.

9. The computer device according to claim 8, wherein each image definition score corresponds to one block in the Se-ResNeXt50 model, and N image definition scores correspond to last N blocks in the Se-ResNeXt50 model;

N branches are extracted from the N blocks, and each branch respectively combines with image size information to obtain the image definition score.

10. The computer device according to claim 7, wherein the comprehensive image definition score is a mean value of the N image definition scores.

11. The computer device according to claim 7, wherein before training to obtain the evaluation model, the method further comprises: performing pre-processing for the obtained image to adjust the obtained image to a size required by the evaluation model; before inputting the image to be processed into the pre-trained evaluation model, the method further comprises: performing pre-processing for the image to be processed to adjust the image to be processed to a size required by the evaluation model.

12. The computer device according to claim 11, wherein the adjusting the image to a size required by the evaluation model comprises:

if a long side of the image is smaller than a length required by the evaluation model, and a short side of the image is smaller than the length required by the evaluation model, the long side and the short side of the image are respectively adjusted to the length required by the evaluation model by adding a gray margin;

if the long side of the image is larger than the length required by the evaluation model, the long side of the image is compressed to the length required by the evaluation model, and the short side of the image is compressed according to the same compression ratio; if the short side after the compression is smaller than the length required by the evaluation model, the short side of the image is adjusted to the length required by the evaluation model by adding a gray margin.

13. A non-transitory computer-readable storage medium on which a computer program is stored, wherein the program, when executed by a processor, implements a method for evaluating image definition, characterized in that the method comprises:

obtaining images of different definitions respectively, and obtaining a comprehensive image definition score of each image;

training according to the obtained images and the corresponding comprehensive image definition scores to obtain an evaluation model;

obtaining an image to be processed;

inputting the image to be processed to qthe pre-trained evaluation model;

obtaining a comprehensive image definition score outputted by the evaluation model, the comprehensive image definition score being obtained by the evaluation model by obtaining N image definition scores based on N different scales respectively, and then integrating the N image definition scores, N being a positive integer greater than one, wherein the obtaining of the comprehensive image definition score of each image comprises:

for each image, respectively obtaining a manually annotated definition class to which the image belongs, the number of definition classes being greater than one, and taking a preset score corresponding to the definition class to which the image belongs as the comprehensive image definition score of the image.

14. The non-transitory computer-readable storage medium according to claim 13, wherein the evaluation model comprises: a Se-ResNeXt50 model.

* * * * *